US012120224B2

United States Patent
Cho et al.

(10) Patent No.: US 12,120,224 B2
(45) Date of Patent: Oct. 15, 2024

(54) METHOD AND SYSTEM FOR PERFORMING A SECURE KEY RELAY OF AN ENCRYPTION KEY

(71) Applicant: ADVA Optical Networking SE, Meiningen OT Dreissigacker (DE)

(72) Inventors: Joo Yeon Cho, Wolfratshausen (DE); Helmut Grießer, Aichach (DE)

(73) Assignee: ADVA NETWORK SECURITY GMBH, Berlin (DE)

( * ) Notice: Subject to any disclaimer, the term of this patent is extended or adjusted under 35 U.S.C. 154(b) by 325 days.

(21) Appl. No.: 17/751,596

(22) Filed: May 23, 2022

(65) Prior Publication Data

US 2023/0018829 A1  Jan. 19, 2023

(30) Foreign Application Priority Data

Jul. 19, 2021  (EP) .................................. 21186492

(51) Int. Cl.
*H04L 9/08*  (2006.01)
(52) U.S. Cl.
CPC .......... *H04L 9/0855* (2013.01); *H04L 9/0825* (2013.01); *H04L 9/085* (2013.01)
(58) Field of Classification Search
CPC ..... H04L 9/0855; H04L 9/0825; H04L 9/085; H04L 9/0822
See application file for complete search history.

(56) References Cited

U.S. PATENT DOCUMENTS 7,787,625 B2 * 8/2010 Vig ....................... H04L 9/0855
380/278
9,503,257 B2 * 11/2016 Tanizawa .............. H04L 9/0858
(Continued)

FOREIGN PATENT DOCUMENTS

EP  3 780 482 A1  2/2021

OTHER PUBLICATIONS

Communication of the extended European search report for European Patent Application No. 21186492.1 (Dec. 20, 2021).
(Continued)

*Primary Examiner* — Abiy Getachew
(74) *Attorney, Agent, or Firm* — Jenkins, Taylor & Hunt, P.A.

(57) ABSTRACT

A method and system for performing a secure key relay of an encryption key, $K_{enc}$, provided by an initial node, $KN_0$, and used by an encoding unit (ENC) of a first data transceiver for encoding plain data, $P_{data}$, to provide encrypted cipher data, $C_{data}$, transported via a data transport link, DTL, to a decoding unit (DEC) of a second data transceiver which decodes the transported cipher data, $C_{data}$, using the relayed encryption key, $K_{enc}$, provided by a terminal node, $KN_N$, as a decoding key to retrieve the plain data, $P_{data}$, wherein the relay of the encryption key, $K_{enc}$, from the initial node, $KN_0$, to the terminal node, $KN_N$, is performed by means of intermediate relay nodes, $KN_1, KN_2 \ldots KN_{N-1}$, and comprises the steps of sharing (S1) QKD-keys, K, between the nodes via secure quantum channels, QCH, of a quantum key distribution network, QKDN; performing (S2) encryption of shared QKD-KEYS, K, at the initial node, $KN_0$, and at each intermediate relay node, $KN_1, KN_2 \ldots KN_{N-1}$, and blinding them with a blinding value, $S_i$, of the respective node to provide an encrypted cipher key, $CK_i$, by the initial node, $KN_0$, and by each intermediate relay node, $KN_1, KN_2 \ldots KN_{N-1}$; distributing (S3) or pre-distributing the blinding values, $S_i$, of the initial node, $KN_0$, and of each intermediate relay node, $KN_1, KN_2 \ldots KN_{N-1}$; transmitting (S4) the encrypted cipher keys, $CK_i$, of the initial node, $KN_0$, and of each of the intermediate relay nodes, $KN_1, KN_2 \ldots KN_{N-1}$, to the terminal node, $KN_N$; performing (S6) by the terminal node, $KN_N$, logic operations on reconstructed or pre-distributed blinding values, $S_i$, on the basis of the encrypted cipher keys, $CK_i$, received by the terminal node, $KN_N$, from the (Continued)

initial node, $KN_0$, and received from each of the intermediate relay nodes, $KN_1, KN_2 \ldots KN_{N-1}$, to provide the encryption key, $K_{enc}$, used by the decoding unit (DEC) of the second data transceiver as a decoding key to retrieve the plain data, $P_{data}$.

17 Claims, 7 Drawing Sheets

(56) References Cited

U.S. PATENT DOCUMENTS

| | | |
|---|---|---|
| 2004/0184603 A1 | 9/2004 | Pearson et al. |
| 2006/0013396 A1* | 1/2006 | Kollmitzer ............ H04L 9/0855 380/256 |
| 2008/0144836 A1 | 6/2008 | Sanders et al. |
| 2016/0127127 A1* | 5/2016 | Zhao ................... H04W 12/041 713/171 |

OTHER PUBLICATIONS

"Draft Recommendation ITU-T Y.QKDN_KM, 'Key Management for quantum key distribution Network'," Telecommunication Standardization Sector, pp. 1-21 (Mar. 2-13, 2020).

* cited by examiner

FIG 2A
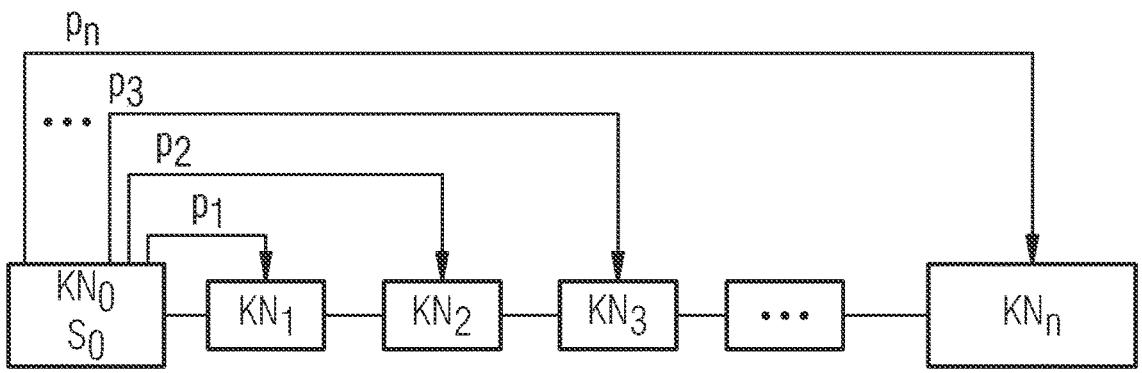
FIG 2B
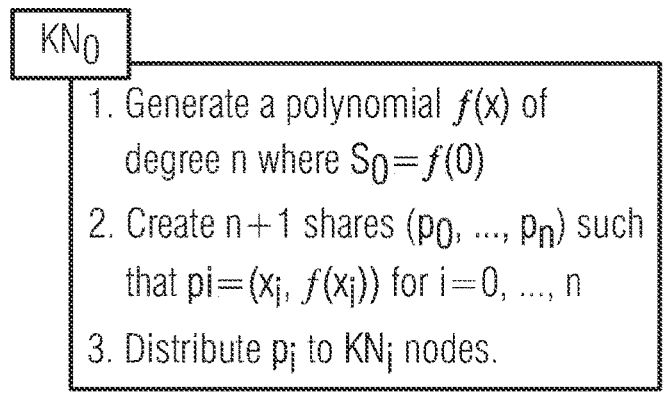
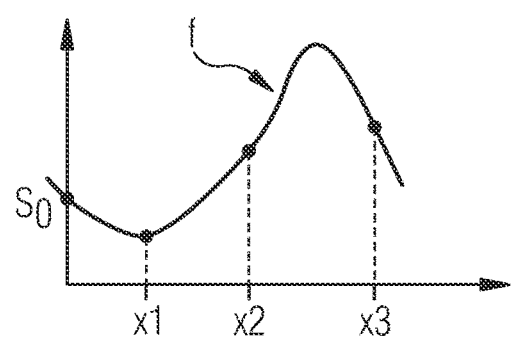

FIG 3
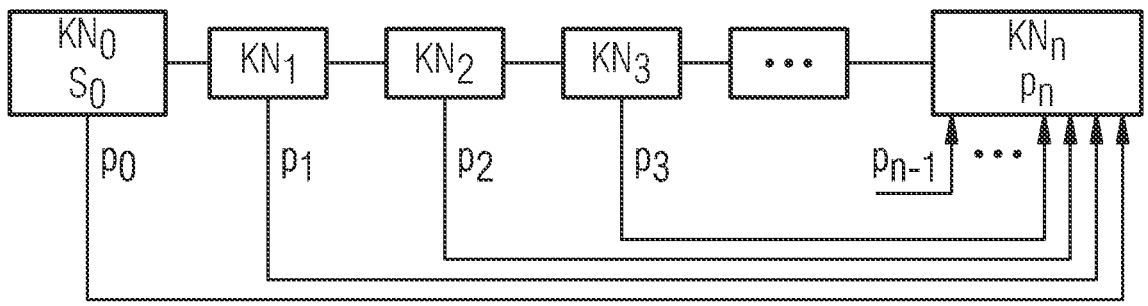
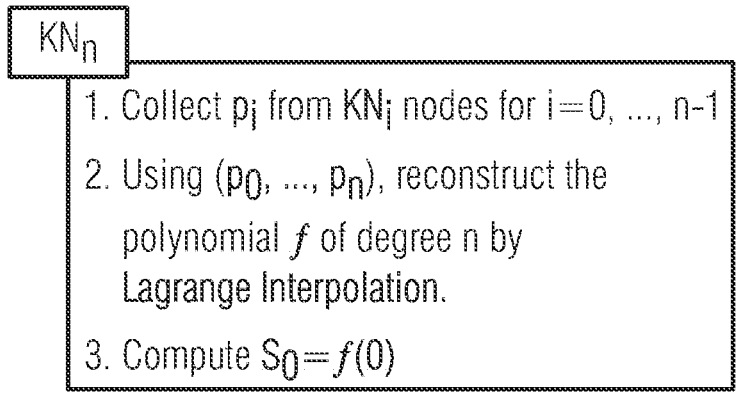

METHOD AND SYSTEM FOR PERFORMING A SECURE KEY RELAY OF AN ENCRYPTION KEY

PRIORITY CLAIM

This application claims the priority benefit of European Patent Application Number 21186492.1, filed Jul. 19, 2021, the disclosure of which is incorporated herein by reference in its entirety.

TECHNICAL FIELD

The invention relates to a computer-implemented method and system for performing a secure key relay of an encryption key making use of secret sharing in a quantum key distribution network.

TECHNICAL BACKGROUND

Quantum key distribution (QKD) relates to a secure communication process which implements a cryptographic protocol involving components of quantum mechanics. Quantum key distribution enables two parties to produce a shared random secret key only known to them wherein the shared random secret key can be used to encrypt and decrypt messages. The unique property of quantum key distribution (QKD) is the ability of the two communicating parties to detect the presence of a third party trying to gain knowledge of the secret key by eavesdropping. A third party trying to eavesdrop on the secret key must in some way measure it thus introducing detectable anomalies. The security of the encryption key that uses quantum key distribution (QKD) relies on the foundations of quantum mechanics, in contrast to traditional public key cryptography which relies on the computational difficulty of certain mathematical functions. Quantum key distribution (QKD) is used to produce and distribute a secret key but not to transmit message data. The distributed secret QKD key can then be used for any chosen encryption algorithm to encrypt and decrypt a message which can be sent and transmitted over a standard communication channel. Quantum key distribution (QKD) protocols provide means to distribute symmetric (identical) random bit streams as secure keys which are secure against any eavesdropper even when the eavesdropper has unbounded computational ability. The basic element of a QKD distribution network is a pair of QKD-modules linked by a QKD-link that allows two remote parties to share secure keys. However, a secure quantum channel linking two remote parties has a limited maximum range. Accordingly, a standard QKD-network requires multiple trusted nodes to relay encryption keys. For example, the Beijing-Shanghai QKD-link in China requires 32 trusted nodes to create a 2,000 km connection. However, since each trusted node has to convert the QKD-key before passing it on, an eavesdropper at the node could potentially get access to the data at the key relay node without being detected. Furthermore, every trusted node used for a key relay has to be physically protected by hardware measures which increases the technical complexity of the key relay. So far, a key relay in a QKD-network can be done either using trusted key relay nodes which comprise measures of physical protection or using so-called quantum repeaters which are able to relay a quantum key in a quantum level. However, a trusted key relay node has a potential security risk whereas a quantum repeater currently is not available in practice. Accordingly, there is a need to provide a method and system for performing a secure relay which does not require the provision of trusted nodes requiring physical protection against access by eavesdropping third parties.

SUMMARY

The invention provides according to the first aspect a method for performing a secure key relay of an encryption key provided by an initial node and used by an encoding unit of a first data transceiver for encoding plain data to provide encrypted cipher data transported via a data transport link to a decoding unit of a second data transceiver which decodes the transported cipher data using the relayed encryption key provided by a terminal node as a decoding key to retrieve the plain data,
wherein the relay of the encryption key from the initial node to the terminal node is performed by means of intermediate relay nodes wherein the method comprises the steps of:
sharing QKD-keys between the nodes via secure quantum channels of a quantum key distribution network, QKDN,
performing encryption of shared QKD-keys at the initial node and at each intermediate relay node and blinding them with a blinding value of the respective node to provide an encrypted cipher key by the initial node and by each intermediate relay node,
transmitting the encrypted cipher keys of the initial node and of each of the intermediate relay nodes to the terminal node, and performing by the terminal node logic operations on blinding values on the basis of the encrypted cipher keys received by the terminal node from the initial node and received from each of the intermediate relay nodes to provide the encryption key used by the decoding unit of the second data transceiver as a decoding key to retrieve the plain data.

An advantage of the computer-implemented method according to the first aspect of the present invention relies in that the intermediate relay nodes do not have to be trusted. Only the initial node and the terminal node have to comprise trusted nodes. Accordingly, even if any of the intermediate relay nodes is hacked, the computer-implemented method according to the present invention performing a secure key relay of an encryption key is still perfectly secure. Consequently, an impact caused by a security breach of any key relay node is significantly reduced. Consequently, the computer-implemented method according to the present invention provides for a much safer key relay between remote parties.

In a possible embodiment of the secure key relay method according to the first aspect of the present invention the blinding values of the initial node and of each intermediate relay node are pre-distributed or are distributed using a secret sharing protocol.

In a possible embodiment of the secure key relay method according to the first aspect of the present invention the blinding values of the initial node and of each intermediate relay node are distributed as shares to the other nodes by using a secret sharing protocol.

In a possible embodiment of the secure key relay method according to the first aspect of the present invention the distributed blinding values of the initial node and of each of the intermediate relay nodes are reconstructed by the terminal node on the basis of the shares received by the terminal node.

In a possible embodiment of the secure key relay method according to the first aspect of the present invention, the secret sharing protocol used to distribute the blinding values of the initial node and of the intermediate relay nodes comprises a Shamir secret sharing protocol.

In a further possible embodiment of the secure key relay method according to the first aspect of the present invention, the blinding value of each node used for blinding the encrypted shared QKD-keys comprises a unique random value.

This unique random value used as a blinding value is generated in a possible embodiment of the secure key relay method according to the first aspect of the present invention by a local random number generator of the respective node.

In a still further possible embodiment of the secure key relay method according to the first aspect of the present invention, the shared QKD-keys are encrypted by performing an XOR-operation on the QKD-keys at the respective node. The shared QKD-keys can be OTP-encrypted.

In a possible embodiment of the secure key relay method according to the first aspect of the present invention, the encrypted QKD-keys are blinded with the blinding value of the respective node by performing an XOR-operation on the encrypted QKD-keys and the respective blinding value of the node.

In a possible embodiment of the secure key relay method according to the first aspect of the present invention, the encryption key is generated by a random number generator of the initial node connected to the encoding unit of the first data transceiver or by a random number generator of the first data transceiver or by a QKD connected to the initial node or by an external key generator connected to the initial node.

In a further possible embodiment of the secure key relay method according to the first aspect of the present invention, the encryption key is received by the encoding unit of the first data transceiver by means of a user interface or by means of a control data interface.

In a still further possible embodiment of the secure key relay method according to the first aspect of the present invention, the encryption key is stored in a key memory along with a key identifier of the encryption key.

In a possible embodiment of the secure key relay method according to the first aspect of the present invention, the key identifier of the encryption key relayed from the initial node via the intermediate relay nodes to the terminal node is transported from the first data transceiver via the data transmission link to the second data transceiver.

The first and second data transceiver can comprise optical transceivers. In this embodiment, the data transmission link is formed by an optical data transmission link.

In an alternative embodiment, the first data transceiver and the second data transceiver comprise electronic transceivers connected to each other via an electrical data transmission link.

In a still further possible embodiment of the secure key relay method according to the first aspect of the present invention, the encrypted cipher data is transported as payload within data packets transmitted by the first data transceiver via the optical or electrical data transmission link to the second data transceiver.

In a further possible embodiment of the secure key relay method according to the first aspect of the present invention, the key identifier of the encryption key is transported in overhead portions of the transported data packets.

In a still further possible embodiment of the secure key relay method according to the first aspect of the present invention, the encryption key is used by the encryption unit of the first data transceiver for performing a symmetric key encryption, for instance AES encryption, of the plain data or as a one-time pad key for a predefined amount of received plain data.

In a still further possible embodiment of the secure key relay method according to the first aspect of the present invention, the initial node, the intermediate relay nodes and the terminal node comprise electrical or optical transceivers connected with each other via transport links used to transport the encrypted cipher keys and the shares of the blinding values between the transceivers.

In a still further possible embodiment of the secure key relay method according to the first aspect of the present invention, the decoding unit of the second data transceiver which decodes the encrypted cipher data received via the data transport link from the first data transceiver uses the relayed encoding key provided by the terminal node as a decoding key, wherein the encoding key used by the decoding unit as the decoding key is identified by the key identifier currently received by the second data transceiver via the data transport link.

In a still further possible embodiment of the secure key relay method according to the first aspect of the present invention, the logic operations performed by the terminal node to provide the encryption key on the basis of the reconstructed or pre-distributed blinding values and the received encrypted cipher keys comprise XOR-operations.

The invention further provides according to a second aspect a secure key relay system used for relay of an encryption key comprising the features of claim 14.

The invention provides according to the second aspect a secure key relay system used for relay of an encryption key, said secure key relay system comprising an initial node connected to an encoding unit of a first data transceiver which is adapted to encode plain data using an encryption key provided by the initial node to provide encrypted cipher data, a terminal node connected to a decoding unit of a second data transceiver which is adapted to decode the encrypted cipher data received from the first data transceiver via a data transport link using a relayed encryption key as a decoding key to retrieve the plain data and at least one intermediate relay node adapted to perform a secure key relay of the encryption key used by the encoding unit from the initial node to the terminal node by performing a secure key relay method according to the first aspect of the present invention.

In a possible embodiment of the secure key relay system according to the second aspect of the present invention, the initial node and the terminal node and the at least one intermediate relay node comprise optical or electrical transceivers connected with each other by means of transport links used to transport the encrypted cipher keys and to transport the shares of the blinding values between the transceivers.

In a further possible embodiment of the secure key relay system according to the second aspect of the present invention, the initial node and the terminal node comprise trusted nodes of the secure key relay system.

In a still further possible embodiment of the secure key relay system according to the second aspect of the present invention, the initial node, the intermediate relay nodes and the terminal node are connected at least pairwise via secure quantum channels of a quantum key distribution network, QKDN.

In a further possible embodiment of the secure key relay system according to the second aspect of the present invention, the data transport link used for transport of the encrypted cipher data between the first and second data transceiver comprises an optical data transport link or an electrical data transport link.

BRIEF DESCRIPTION OF FIGURES

In the following, possible embodiments of the different aspects of the present invention are described in more detail with reference to the enclosed figures.

FIGS. 2A, 2B illustrate a possible embodiment of a secret sharing protocol employed in a possible embodiment of the secure key relay system according to the present invention;

FIG. 3 shows a further diagram for illustrating an operation of a secret sharing protocol used by the secure key relay system according to the present invention;

DETAILED DESCRIPTION OF EMBODIMENTS

Figure 1:
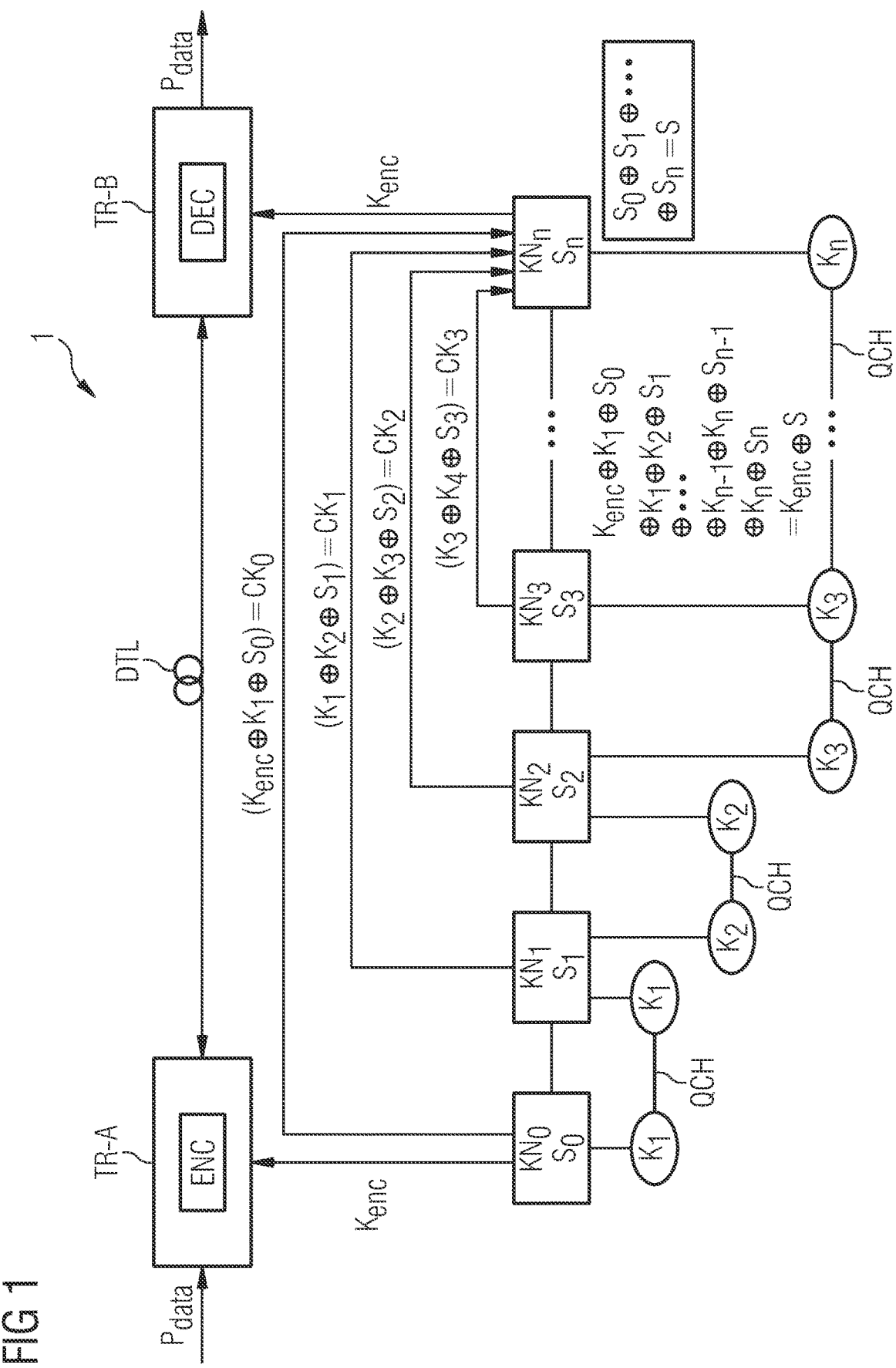
FIG. 1 shows a block diagram for illustrating a possible exemplary embodiment of a secure key relay system according to the present invention.

FIG. 1 shows schematically a possible exemplary embodiment of a secure key relay system 1 according to the present invention used for relay of an encryption key $K_{enc}$. The secure key relay system 1 as illustrated in FIG. 1 can be used to perform a secure key relay of at least one encryption key $K_{enc}$ provided by an initial node $KN_0$ to a terminal node $KN_N$ via intermediate key relay nodes $KN_1, KN_2 \ldots KN_{N-1}$. The encryption key $K_{enc}$ is provided by the initial node $KN_0$ and can be used by an encoding unit ENC of a first data transceiver TR-A for encoding or encrypting plain data $P_{data}$ to provide encrypted cipher data $C_{data}$. The encoding unit ENC of the first data transceiver TR-A (Alice) is adapted to encode plain data $P_{data}$ using the encryption key $K_{enc}$ received from a data source. The encoding unit ENC of the first data transceiver TR-A provides encrypted cipher data $C_{data}$ transported via a data transport link DTL to a decoding unit DEC of a second data transceiver TR-B which decodes the transported cipher data $C_{data}$ using the relayed encryption key $K_{enc}$ provided by the terminal node $KN_N$ as a decoding key to retrieve the plain data $P_{data}$. The retrieved plain data $P_{data}$ can be further processed by a subsequent processing unit. The relay of the encryption key $K_{enc}$ from the initial node $KN_0$ to the terminal node $KN_N$ is performed by the intermediate relay nodes $KN_1, KN_2 \ldots KN_{N-1}$ as illustrated in FIG. 1. The initial node $KN_0$, the terminal node $KN_N$ and the at least one intermediate key relay node can comprise in a possible embodiment electrical or optical transceivers connected with each other by means of electrical or optical transport links used to transport the encrypted cipher keys CK and shares p of the blinding values $S_i$ between the transceivers. The number of intermediate key relay nodes KN used for relay of the encryption key $K_{enc}$ can vary depending on the use case, in particular depending on the length of the optical or electrical data transport link DTL between the transceivers TR-A, TR-B.

Figure 5:
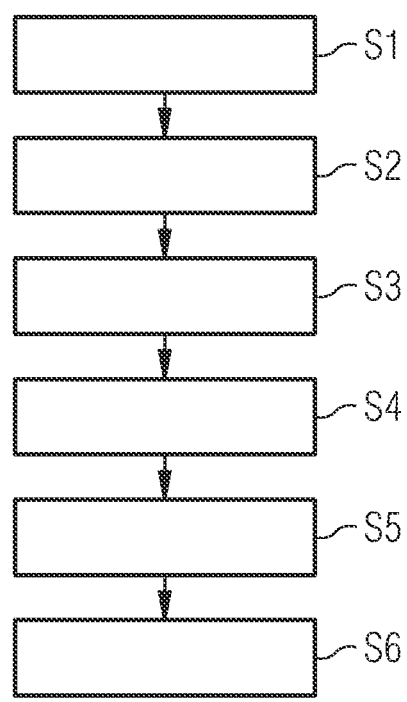
FIG. 5 shows a flowchart of a possible exemplary embodiment of a computer-implemented method for performing a secure key relay of an encryption key.

The relay of the encryption key $K_{enc}$ can be performed by the computer-implemented method as illustrated in the flowchart of FIG. 5. In FIG. 5 a possible embodiment for a key encryption relay using secret sharing protocols is illustrated. Other techniques to encrypt or blind the communication between the intermediate nodes and the terminal node can be used in alternative embodiments.

In a first step S1, QKD-keys are shared between nodes via secure quantum channels QCH of a quantum key distribution network QKDN. As illustrated in FIG. 1, the initial node $KN_0$, the intermediate relay nodes $KN_1, KN_2 \ldots KN_{N-1}$ as well as the terminal node $KN_N$ form a chain of nodes connected with each other via electrical transport links ETL as shown in FIG. 1. Further, neighboring nodes are connected pairwise by secure quantum channels QCH of a quantum key distribution network QKDN. In the quantum layer, a pair of QKD-modules can generate a pair of symmetric (identical) random bit strings based on an QKD protocol. Each QKD-module can be installed in a node of the key relay node chain illustrated in FIG. 1. Accordingly, at least two neighboring nodes within the key relay node chain shown in FIG. 1 can share QKD-keys via a secure quantum channel QCH as shown in FIG. 1.

In a further step for performing the secure key relay of the encryption key $K_{enc}$, the encryption of shared QKD-keys at the initial node $KN_0$ and at each intermediate node is performed in step S2 and then they are blinded with a blinding value $S_i$ of the respective node to provide an encrypted cipher key by the initial node $KN_0$ and by each intermediate relay node $KN_1, KN_2 \ldots KN_{N-1}$. Each node $KN_i$ can hold a so-called blinding value $S_i$. The binding value $S_i$ of a node can be pre-distributed to the respective node or can be distributed to the node using a secret sharing protocol. Blinding comprises a technique to hide a secret key by performing an XOR-operation with a random value. Blinding forms a specific encryption technique. The blinding values $S_i$ of the different nodes can be distributed to the nodes by a secret sharing protocol SSS in such a way that an aggregation or a so-called sum of all blinding values $S_i$ can be calculated only at the terminal node $KN_N$ as also illustrated in FIG. 1. The blinding values $S_i$ can in a possible embodiment be distributed to the key relay nodes by a secret sharing protocol SSS before a key relay is performed. In a possible embodiment, the secret sharing protocol SSS used to distribute the blinding values $S_i$ in step S3 is formed by a Shamir secret sharing (SSS) protocol. The distribution of the blinding values in step S3 is not necessary if the blinding values have already been pre-distributed. The secret sharing protocol SSS in general comprises an input or distribution phase and a reconstruction phase as also illustrated in FIGS. 2A, 2B, 3. The blinding values $S_i$ of the initial node $KN_0$ and of each intermediate key relay node $KN_1, KN_2 \ldots KN_{N-1}$ are distributed in step S3 as shares p to the other nodes by using a secret sharing protocol, in particular the Shamir secret sharing protocol SSS as shown schematically in FIG. 2A. The calculation of the shares p can be achieved by using a polynomial function f as illustrated in the example of FIG. 2B. In an alternative embodiment the blinding values $S_i$ can be pre-distributed to the nodes.

After having distributed the shares p using the secret sharing protocol SSS, in step S3 the encrypted cipher keys $CK_i$ of the initial node $KN_0$ and of each of the intermediate relay nodes $KN_1, KN_2 \ldots KN_{N-1}$ are transmitted in step S4 to the terminal node $KN_N$.

In a further step S5, the blinding values $S_i$ of the initial node $KN_0$ and each of the intermediate relay nodes $KN_1, KN_2 \ldots KN_{N-1}$ can be reconstructed on the basis of the shares p received by the terminal node $KN_N$. The reconstruction of the blinding values $S_i$ is illustrated in FIG. 3. If the blinding values $S_i$ have been pre-distributed the reconstruction in step S5 is not required.

In a final step S6, logic operations are performed by the terminal node $KN_N$ on the reconstructed or pre-distributed blinding values $S_i$ on the basis of the encrypted cipher keys $CK_i$ received by the terminal node $KN_N$ from the initial node $KN_0$ and received from each of the intermediate relay nodes $KN_1$, $KN_2$ ... $KN_{N-1}$ to provide the original encryption key $K_{enc}$ used by the decoding unit DEC of the second data transceiver TR-B (Bob) as a decoding key to retrieve the plain data $P_{data}$ as also illustrated in FIG. 1.

The computer-implemented method for performing a secure key relay of an encryption key $K_{enc}$ comprises in a possible embodiment the main steps S1,S2,S4,S6 as illustrated in the flowchart of FIG. 5. In FIG. 5 a possible embodiment for a key encryption relay is illustrated where a secret sharing protocol is used to distribute blinding values. Other techniques to encrypt or blind the communication between the initial node $KN_0$/intermediate relay nodes $KN_i$ and the terminal node $KN_N$ can be used in alternative embodiments. Accordingly the steps S3, S5 illustrated in the flowchart of FIG. 5 form optional steps.

A first step S1 of sharing the QKD-keys is performed by a quantum key distribution network QKDN connected to the nodes of the secure key relay chain as shown in FIG. 1.

A step S2 of performing an encryption of the shared QKD-keys and a step of distributing S3 the blinding values $S_i$ is performed by every key relay node of the key relay node chain shown in FIG. 1 with the exception of the terminal node $KN_N$.

Accordingly, the present invention provides according to a further aspect a key relay node KN adapted to perform encryption of a shared QKD-key and adapted to blind an encryption key $K_{enc}$ with a blinding value $S_i$ to provide an encrypted cipher key $CK_i$ which is transmitted by the respective key relay node KN to the terminal node $KN_N$. The respective key relay node KN is further adapted to distribute shares p of its blinding value $S_i$ to the other key relay nodes KN within the key relay node chain using a secret sharing protocol.

The terminal node $KN_N$ is adapted to perform steps S5, S6 of the embodiment of the computer-implemented method as illustrated in the flowchart of FIG. 5. The terminal node $KN_N$ is adapted to reconstruct the blinding values S of the initial node and of each of the intermediate key relay nodes $KN_1$, $KN_2$ ... $KN_{N-1}$ on the shares p received from the other nodes. The terminal node is further adapted to perform logic bitwise operations on the reconstructed blinding values $S_i$ on the basis of the encrypted cipher keys $CK_i$ received by the terminal node $KN_N$ from the initial node $KN_0$ and from each of the intermediate key relay nodes $KN_1$, $KN_2$ ... $KN_{N-1}$ to provide the original encryption key $K_{enc}$ and to supply this encryption key to the decoding unit DEC of the second data transceiver TR-B. The decoding unit DEC uses the supplied key as a decryption key in a symmetrical decryption algorithm to retrieve the original plain data $P_{data}$.

In a possible embodiment, the blinding value $S_i$ of each node used for blinding the encrypted shared QKD-keys K comprises a unique random value. This unique random value can be generated in a possible embodiment by a local random number generator RNG implemented in the respective node. The random number generator RNG may be implemented as a pseudo random number generator PRNG.

The QKD-keys K shared between the nodes via the secure quantum channels QCH in step S1 can be OTP-encrypted in step S2 in a possible embodiment by performing a bitwise XOR-operation on the shared QKD-keys K at the respective node. The OTP-encrypted QKD-keys can be blinded in step S2 with the blinding value $S_i$ of the respective node by performing also an XOR-operation on the OTP-encrypted QKD-keys and the respective blinding value $S_i$ of the respective node.

In a possible embodiment of the secure key relay system 1 as illustrated in FIG. 1, the encryption key $K_{enc}$ can be generated by a key generator of the initial node $KN_0$ being connected to the encoding unit ENC of the first data transceiver TR-A or by a QKD connected to the initial node. In an alternative embodiment, the encryption key $K_{enc}$ can also be received from an external key generator connected to the initial node or by means of a user interface or by means of a control data interface.

The generated or received encryption key $K_{enc}$ can be stored in a local key memory of the first data transceiver TR-A along with an associated unique key identifier KEY-ID of the respective encryption key $K_{enc}$. The key identifier KEY-ID of the encryption key $K_{enc}$ is transported from the first data transceiver TR-A (Alice) via the data transmission link DTL to the second data transceiver TR-B (Bob). Along the same data transmission link DTL, the encrypted cipher data $C_{data}$ can be transported as payload within data packets DP. Each data packet DP can comprise an overhead OH and a payload section PL. The data packets DPs are transmitted by the first data transceiver TR-A via the data transmission link DTL to the second data transceiver TR-B. The data transmission link DTL can comprise in a preferred embodiment an optical data transmission link ODTL. In an alternative embodiment, the data transmission link DTL can also comprise a wired or wireless electronic data transmission link EDTL. The key identifier KEY-ID of the encryption key $K_{enc}$ which is relayed from the initial node $KN_0$ via the intermediate key relay nodes $KN_1$, $KN_2$ ... $KN_{N-1}$ to the terminal node $KN_N$ can be transported in a possible embodiment within an associated field of the overheads OH of the associated transport data packets DPs. The encryption key $K_{enc}$ is used by the encoding unit ENC of the first data transceiver TR-A for performing a symmetric key encryption, for instance AES, of the plain data $P_{data}$. The employed key encryption can comprise a symmetric key encryption. The symmetric encryption and decryption has the advantage that it can be performed at a high processing speed. The encryption key $K_{enc}$ can be used as a one-time pad OTP for a predefined amount of the received plain data $P_{data}$.

The plain data P can comprise any kind of data such as image data, audio data or text data used to carry information from the same or different data sources.

The encryption of the plain data P and the decryption of the encrypted payload data PL can be performed by the transceivers TR in real time. The key relay can be performed in parallel in real time during transport of the data packets DP via the data transport link DTL. In an alternative embodiment a key relay of a sequence or group of encryption keys can be performed in advance of the transport of the encrypted data payload PL within the data packets DPs. In this case the serial transmitted data packets DPs carry a corresponding sequence of associated key identifiers Key-IDs for the already relayed encryption keys.

The transport of the encrypted data via the data transport link DTL can be performed by means of data packets. In an alternative embodiment the transport of the encrypted data can be performed in a data stream.

The initial node $KN_0$, the intermediate relay nodes $KN_1$, $KN_2$ ... $KN_{N-1}$ and the terminal node $KN_N$ comprise in a possible embodiment electrical transceivers connected with each other via electrical transport links which can be used to transport the encrypted cipher keys $CK_i$ as well as the shares p of the blinding values $S_i$ of the respective nodes between the electrical transceivers. In an alternative embodiment the initial node $KN_0$, the intermediate relay nodes $KN_1$, $KN_2 \ldots KN_{N-1}$ and the terminal node $KN_N$ comprise optical transceivers connected with each other via optical transport links which can be used to transport the encrypted cipher keys CKi as well as the shares p of the blinding values Si of the respective nodes between the optical transceivers.

The decryption unit DEC of the second data transceiver TR-B (Bob) is adapted to decode, i.e. to decrypt, the encrypted cipher data $C_{data}$ received via the data transport link DTL from the first data transceiver TR-A using the relayed encoding key $K_{enc}$ provided by the terminal node $KN_N$ as a decoding key. The key used by the decoding unit DEC as a decoding key is identified by the key identifier KEY-ID currently received by the second data transceiver TR-B via the data transport link DTL. This key identifier KEY-ID can be transported within a field of an overhead OH of the received data packets. In a possible embodiment, the logic operations performed in step S6 by the terminal node $KN_N$ to provide the encryption key $K_{enc}$ used by the decoding unit DEC for decryption comprise XOR-operations performed on the basis of the reconstructed blinding values S and the received encrypted cipher keys $CK_i$.

As can be seen in the block diagram of FIG. 1, the initial node $KN_0$ as well as each intermediate key relay node $KN_1$, $KN_2 \ldots KN_{N-1}$ is adapted to perform an XOR-operation on a pair of shared QKD-keys and blinding them with an associated blinding value $S_i$ of the respective node to provide an encrypted cipher key $CK_i$. For example, the initial node $KN_0$ performs an XOR-operation of the shared QKD-keys $K_{enc}$, K1 and blinds them with a blinding value $S_0$ to calculate an encrypted cipher key $CK_0$. In the same manner, the first intermediate relay node $KN_1$ performs an XOR-operation of the shared QKD-keys K1, K2 and blinds them with a blinding value $S_i$ also performing an XOR-operation to provide an encrypted cipher key $CK_i$. All these calculated encrypted cipher keys $CK_i$ are supplied by the initial node $KN_0$ and by each intermediate key relay node $KN_1$, $KN_2 \ldots KN_{N-1}$ to the terminal node $KN_N$.

The blinding values S of the initial node $KN_0$ and of each intermediate key relay node $KN_1$, $KN_2 \ldots KN_{N-1}$ can be distributed as shares p to the other nodes by using a secret sharing protocol SSS as illustrated in FIGS. 2A, 2B. First, a polynomial f(x) of degree n is generated where $S_0$ of the polynomial function f(x)=f(0) as also illustrated in FIG. 2B. In a further substep n+1 shares $p_0, \ldots p_n$ are created such that $p_i=(x_i,f(x_i))$ for i=0, ..., n. Finally, the created share $p_i$ is distributed to the key relay nodes $KN_i$ as shown schematically in FIG. 2A. The distribution of the shares p of the blinding values $S_i$ is performed by means of electrical transport links ETL connecting the initial node $KN_0$, the terminal node $KN_N$ and the at least one intermediate key relay node $KN_1$, $KN_2 \ldots KN_{N-1}$. There is a single initial node $KN_0$, a single terminal node $KN_N$ and a predefined number of key relay nodes KN. Each node is adapted to share its blinding value $S_i$ with the other nodes by using a secret sharing protocol, in particular Shamir's secret sharing protocol SSS. Each nodes generates in a possible embodiment a random value and can convert the generated random value into n shares p using the secret sharing protocol SSS. Each share p is distributed to the other nodes one by one. The terminal node $KN_N$ is adapted to aggregate the n shares p received from the other nodes to calculate an aggregation share S of the blinding values $S_i$. This is also illustrated in FIG. 3. FIG. 3 illustrates a reconstruction phase using a secret sharing protocol SSS. The reconstruction is performed by the terminal node $KN_N$ on the basis of the received shares $p_i$. In a first substep, the shares $p_i$ received from the other nodes $KN_i$ (i=0, ... N-1) are collected by the terminal node $KN_N$. The received and temporarily stored shares $p_0, \ldots p_n$ of the other nodes are reconstructed by the terminal node using the polynomial function f of degree n by Lagrange interpolation. From this, the blinding value $S_i$ for each node can be reconstructed or computed Si=f(0). The terminal node $KN_N$ can then perform logic operations, in particular XOR-operations, on the reconstructed blinding values on the basis of the encrypted cipher keys $CK_i$ received by the terminal node $KN_N$ from the initial node $KN_0$ and received from each of the intermediate relay nodes $KN_1, KN_2 \ldots KN_{N-1}$ to provide the original encryption key $K_{enc}$ which then can be used by the decoding unit DEC of the second data transceiver TR-B as the decoding key in a decryption process to retrieve the plain data $P_{data}$.

The secure key relay system 1 according to the present invention can in a possible embodiment make use of a method of distributing and reconstructing blinding values $S_i$ involving a secret sharing protocol. This includes an input sharing phase as illustrated in the diagram of FIG. 2A and a reconstruction phase as illustrated in the diagram of FIG. 3. At the input sharing phase as illustrated in FIG. 2A, each node generates a unique blinding value $S_i$ which can be converted into n shares p by a secret sharing technique. Then, these shares p are distributed to other n relay nodes one by one as shown in FIG. 2A.

In a reconstruction phase, the terminal node $KN_N$ aggregates the n shares p from the other nodes and reconstructs the original blinding value $S_i$ from each node by a secret sharing technique. This process can be repeated for every relay node. By this process, each blinding value $S_i$ is kept perfectly secure unless all nodes are hacked and their shares are revealed.

Besides the process of distributing and reconstructing blinding values $S_i$ by using a secret sharing protocol, the secure key relay system 1 also uses a process of hiding the QKD-key by performing an XOR-operation with a random value. Each key relay node generates a unique random value which forms a so-called blinding value S. The shared QKD-keys at each node are XORed with each other (OTP-encrypted) and can then in addition also undergo an XOR-operation with the associated blinding value ($CK_i=(K_i \oplus K_{i+1} \oplus S_i)$). Then, the outcome, i.e. the cipher key $CK_i$, is sent to the trusted terminal node $KN_N$. In this process, a security breach of a key relay node may reveal the shared QKD-keys K and the blinding value $S_i$ but does not reveal any information on other QKD keys K of other nodes since each node comprises different blinding values S. Hence, the encryption key $K_{enc}$ which is relayed over the nodes is protected under all circumstances.

Figure 4:
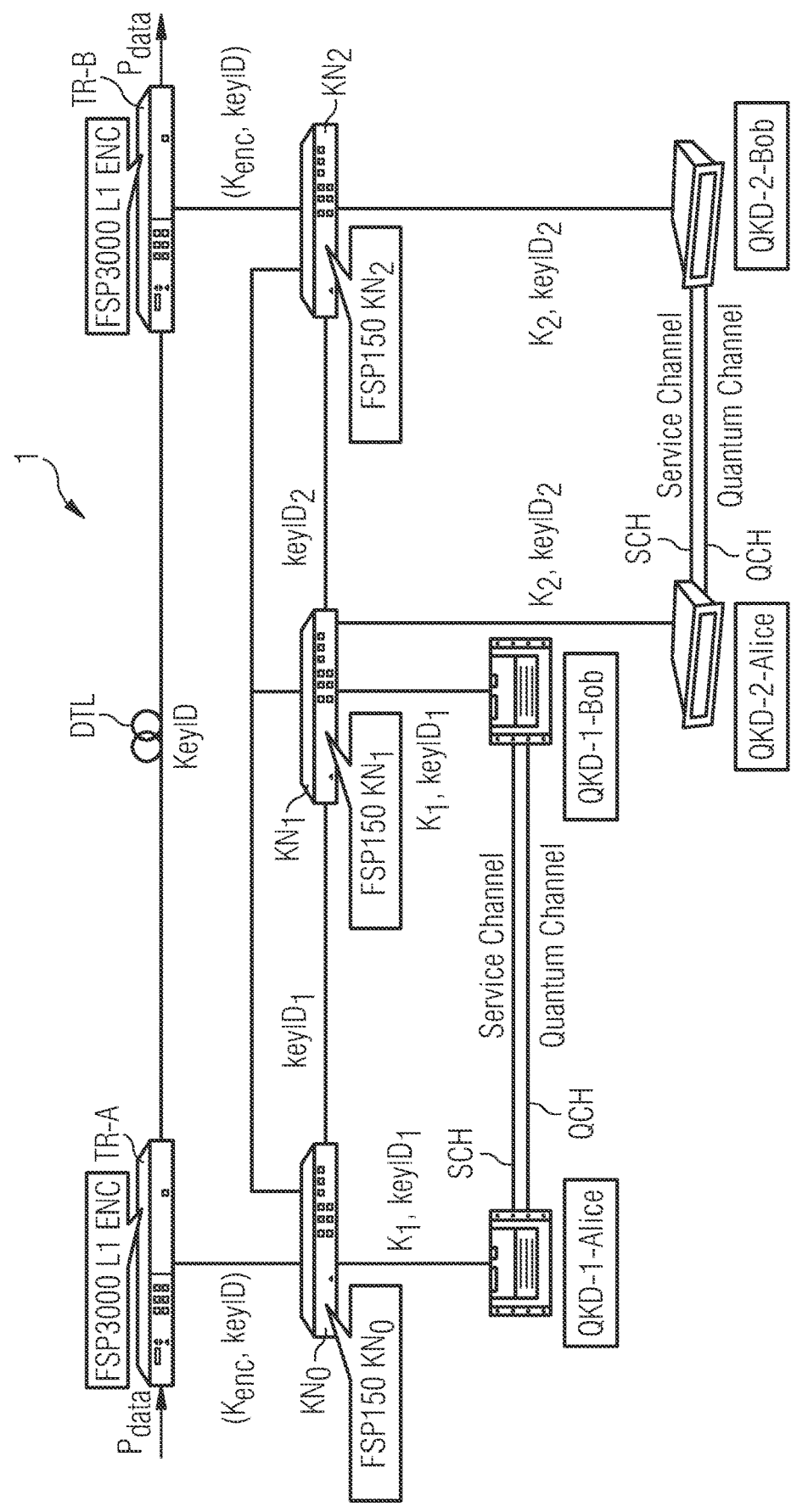
FIG. 4 shows a block diagram for illustrating a possible exemplary embodiment of a secure key relay system according to the present invention.
Figure 7:
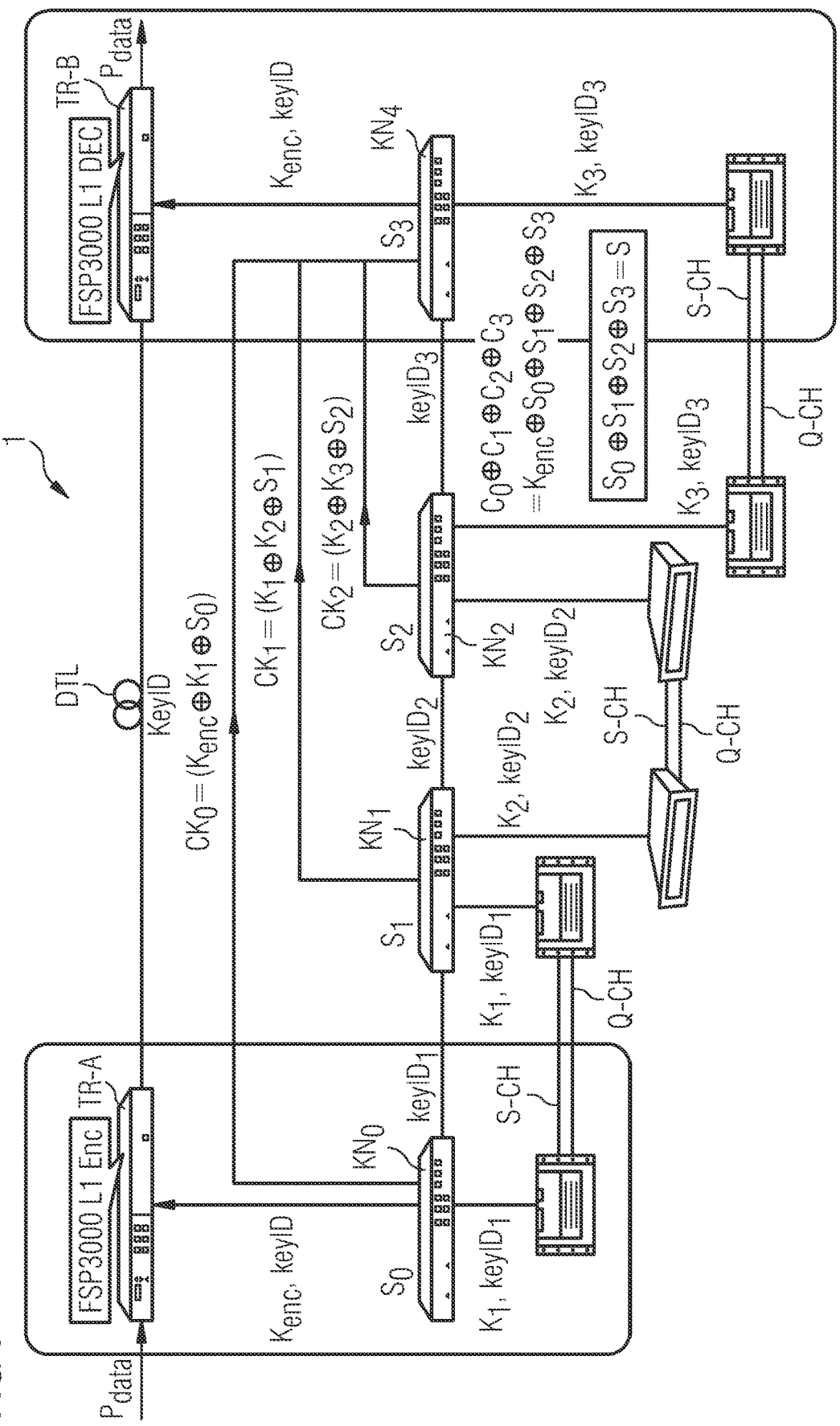

FIG. 4 shows a possible embodiment of a secure key relay system 1 according to the present invention. In the illustrated example, the secure key relay system 1 comprises a first data transceiver TR-A connected via a data transmission link DTL to a second data transceiver TR-B. In the illustrated embodiment, both transceivers TR-A, TR-B comprise optical transceivers connected via an optical data transmission link. Plain data $P_{data}$ can be encrypted by an encryption unit ENC of the first data transceiver TR-A to provide encrypted cipher data $C_{data}$ transported via the optical data transport link ODTL to a decoding unit DEC of the second data transceiver TR-B. The decoder DEC of the second transceiver TR-B uses a relayed encryption key $K_{enc}$ provided by the connected terminal node $TN_N$ as a decoding key to retrieve in a decryption process the original plain data $P_{data}$. In the illustrated example, the first and second transceiver TR-A, TR-B comprise an FSP3000 unit. In the illustrated examples of FIGS. 4,7 the key relay nodes KN used for relaying the encryption key $K_{enc}$ can comprise optical or electrical transceivers connected with each other by means of optical or electrical transport links used to transport the encrypted cipher keys $CK_i$ and the shares p of the blinding values $S_i$ between the transceivers. In the illustrated examples of FIG. 4, 7 the transceivers can comprise FSP150 devices. FIG. 4 shows an embodiment with a single key relay node KN1. FIG. 7 shows an embodiment with two key relay nodes KN1, KN2. The key relay nodes can be untrusted nodes and may not require additional protection mechanisms. The initial node and the terminal nodes are trusted nodes.

Figure 6:
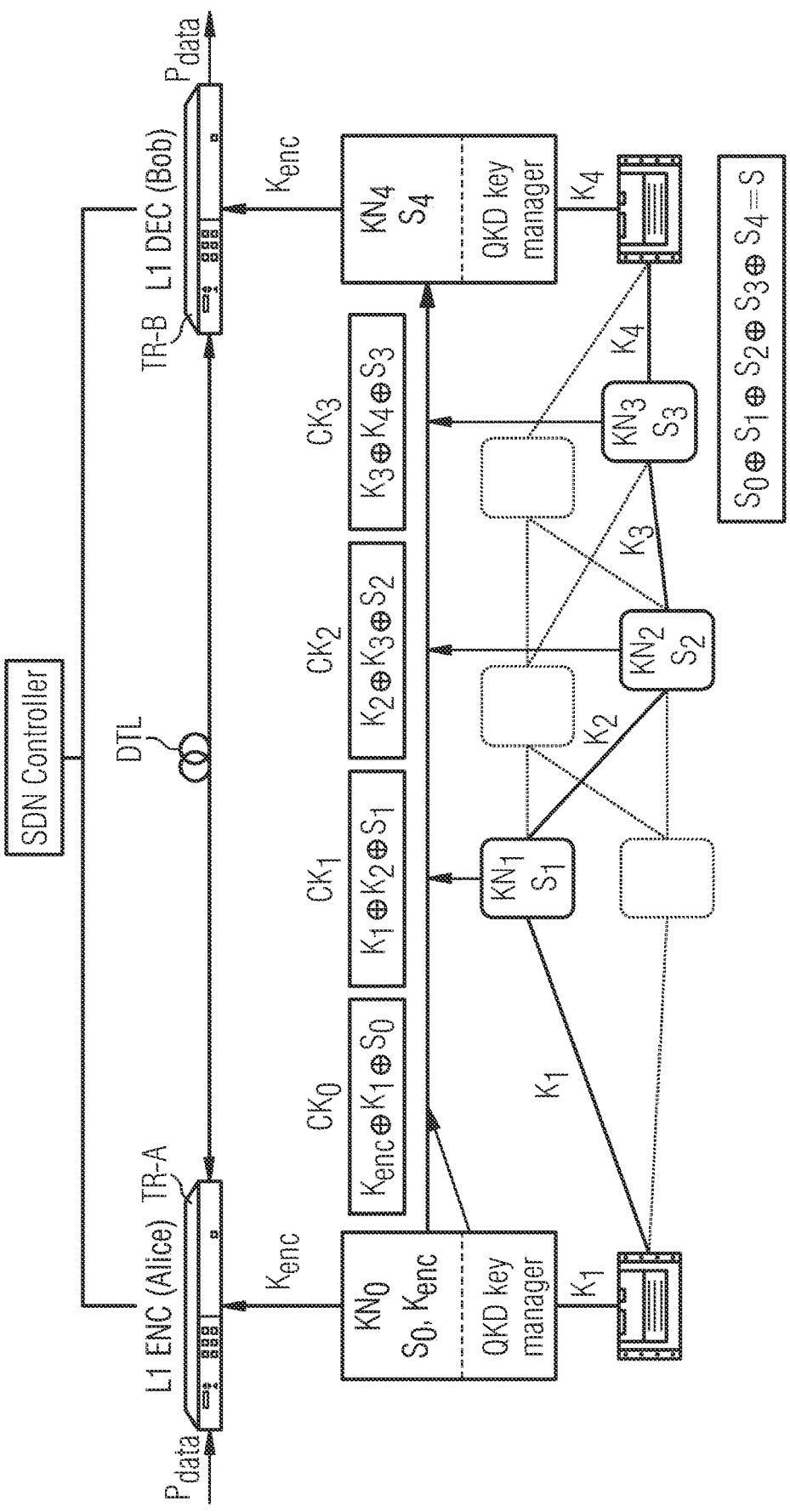
FIGS. 6, 7 show block diagrams for illustrating further possible exemplary embodiments of a secure key relay system according to the present invention.

The electrical transceivers can comprise Ethernet transceivers. The electrical transceivers are in turn connected to QKD-units which provide quantum channels QCH for sharing QKD-keys between nodes. As can be seen in FIG. 4, a pair of QKD-units is connected via a secure quantum channel QCH and an associated service channel required for processing the shared quantum keys. Two QKD-units share a QKD key for secure communication through the QKD-network. As can be seen from the diagram of FIG. 4, the secure key relay system 1 comprises a chain of key relay nodes between an initial node $KN_0$ and a terminal $KN_N$ formed by electrical transceivers such as Ethernet transceivers. The key relay nodes used for the key relay have connection to a background QKD (quantum key distribution) network. This is used to share QKD-keys K between the electrical transceivers used for a key relay. The secure key relay system 1 can be connected to a data transport system which uses a medium for data transport. The data transport system can use either optical data transport links ODTL or electrical data transport links EDTL. As can be seen in FIG. 4, the secure key relay system 1 is sandwiched between the nodes of the data transport system and the nodes of the quantum key distribution network QKDN. Since the number of key relay nodes KN is unlimited, the secure key relay can be performed over a wide distance between two remote transceivers TR-A and TR-B. The range of key relay can comprise several hundred or even thousands of kilometers. Accordingly, there is no restriction for the key relay range in contrast to a conventional quantum channel. The required XOR-operations as illustrated in FIG. 1 can be performed very fast without requiring hardware with high complexity. The secure key relay system 1 is very resilient against attacks without requiring hardware protection of the intermediate key relay nodes. The sequence or chain of key relay nodes KN can also comprise nodes on a path of a meshed network as also illustrated in FIG. 6. In the illustrated embodiment of FIG. 6 the key relay nodes KN can be managed by registration, switch on/off or e.g. authentication. In a possible embodiment an optimal route can be found based on QKD key rates an access rate. It is also possible to change the route on request dynamically. In case of a security breach emergency key relay nodes KN can be added, removed or updated. In a possible embodiment the transceivers TR-A, TR-B can be connected to a SDN Controller as shown in FIG. 6.

The invention claimed is:

1. A method for performing a secure key relay of an encryption key, $K_{enc}$, provided by an initial node, $KN_0$, and used by an encoding unit of a first data transceiver for encoding plain data, $P_{data}$, to provide encrypted cipher data, $C_{data}$, transported via a data transport link, DTL, to a decoding unit (DEC) of a second data transceiver which decodes the transported cipher data, $C_{data}$, using the relayed encryption key, $K_{enc}$, provided by a terminal node, $KN_N$, as a decoding key to retrieve the plain data, $P_{data}$, wherein the relay of the encryption key, $K_{enc}$, from the initial node, $KN_0$, to the terminal node, $KN_N$, is performed by means of intermediate relay nodes, $KN_1$, $KN_2$ . . . $KN_{N-1}$, and comprises the steps of:

sharing QKD-keys, K, between the nodes via secure quantum channels, QCH, of a quantum key distribution network, QKDN;

performing encryption of shared QKD-KEYS, K, at the initial node, $KN_0$, and at each intermediate relay node, $KN_1$, $KN_2$ . . . $KN_{N-1}$, and blinding them with a blinding value, $S_i$, of the respective node to provide an encrypted cipher key, $CK_i$, by the initial node, $KN_0$, and by each intermediate relay node, $KN_1$, $KN_2$ . . . $KN_{N-1}$;

transmitting the encrypted cipher keys, $CK_i$, of the initial node, $KN_0$, and of each of the intermediate relay nodes, $KN_1$, $KN_2$ . . . $KN_{N-1}$, to the terminal node, $KN_N$; and performing by the terminal node, $KN_N$, logic operations on blinding values, $S_i$, on the basis of the encrypted cipher keys, $CK_i$, received by the terminal node, $KN_N$, from the initial node, $KN_0$, and received from each of the intermediate relay nodes, $KN_1$, $KN_2$ . . . $KN_{N-1}$, to provide the encryption key, $K_{enc}$, used by the decoding unit (DEC) of the second data transceiver as a decoding key to retrieve the plain data, $P_{data}$, wherein the blinding values, Si, of the initial node, $KN_0$, and of each of the intermediate relay nodes, $KN_1$, $KN_2$ . . . $KN_{N-1}$, is reconstructed by the terminal node, $KN_N$, on the basis of the shares, p, received by the terminal node, $KN_N$.

2. The secure key relay method according to claim 1 wherein the blinding values, Si, of the initial node, $KN_0$, and of each intermediate relay node, $KN_1$, $KN_2$ . . . $KN_{N-1}$, are distributed as shares, p, to the other nodes by using a secret sharing protocol.

3. The secure key relay method according to claim 2 wherein the secret sharing protocol used to distribute the blinding values, $S_i$, of the initial node, $KN_0$, and of the intermediate relay nodes, $KN_1$, $KN_2$ . . . $KN_{N-1}$, comprises a Shamir secret sharing (SSS) protocol.

4. The secure key relay method according to claim 1 wherein the blinding value, $S_i$, of each node used for blinding the encrypted shared QKD-keys, K, comprises a unique random value which is generated by a local random number generator, RNG, of the respective node.

5. The secure key relay method according to claim 1 wherein the encrypted QKD-keys, K, are blinded with the blinding value, $S_i$, of the respective node by performing an XOR-operation on the encrypted QKD-keys and the respective blinding value, $S_i$, of the node.

6. The secure key relay method according to claim 1 wherein the encryption key, $K_{enc}$, is generated by a key generator of the initial node, $KN_0$, connected to the encoding unit of the first data transceiver or wherein the encryption key, $K_{enc}$, is received by the encoding unit of the first data transceiver by means of a user interface or by means of a control data interface.

7. The secure key relay method according to claim 1 wherein the encryption key, $K_{enc}$, is stored in a key memory along with a key identifier, KEY-ID, of the encryption key, $K_{enc}$, wherein the key identifier, KEY-ID, of the encryption key, $K_{enc}$, relayed from the initial node, $KN_0$, via the intermediate relay nodes, $KN_1$, $KN_2$ . . . $KN_{N-1}$, to the terminal node, $KN_N$, is transported from the first data transceiver via the data transmission link, DTL, to the second data transceiver.

8. The secure key relay method according to claim 1 wherein the encrypted cipher data, $C_{data}$, is transported as payload within data packets transmitted by the first data transceiver via the data transmission link, DTL, to the second data transceiver wherein the key identifier, KEY-ID, of the encryption key, $K_{enc}$, is transported in the overheads, OH, of the transported data packets.

9. The secure key relay method according to claim 1 wherein the encryption key, $K_{enc}$, is used by the encryption unit (ENC) of the first data transceiver for performing a symmetric key encryption, such as AES, of the plain data, $P_{data}$, or as a one-time pad, OTP, for a predefined amount of received plain data, $P_{data}$, or for a predefined time period.

10. The secure key relay method according to claim 1 wherein the initial node, $KN_0$, the intermediate relay nodes, $KN_1, KN_2 \ldots KN_{N-1}$, and the terminal node, $KN_N$, comprise electrical or optical transceivers connected with each other via transport links used to transport the encrypted cipher keys, $CK_i$, and the shares, p, of the blinding values, $S_i$, between the transceivers.

11. The secure key relay method according to claim 1 wherein the decoding unit of the second data transceiver which decodes the encrypted cipher data, $C_{data}$, received via the data transport link, DTL, from the first data transceiver uses the relayed encoding key, $K_{enc}$, provided by the terminal node, $KN_N$, as a decoding key, wherein the encoding key used by the decoding unit as the decoding key is identified by the key identifier, KEY-ID, currently received by the second data transceiver via the data transport link, DTL.

12. The secure key relay method according to claim 1 wherein the logic operations performed by the terminal node, $KN_N$, to provide the encryption key, $K_{enc}$, on the basis of the reconstructed blinding values, $S_i$, and the received encrypted cipher keys, $CK_i$, comprise XOR-operations.

13. A secure key relay system used for relay of an encryption key, $K_{enc}$, said secure key relay system comprising:
an initial node, $KN_0$, connected to an encoding unit (ENC) of a first data transceiver which is adapted to encode plain data, $P_{data}$, using an encryption key, $K_{enc}$, provided by the initial node, $KN_0$, to provide encrypted cipher data, $C_{data}$;
a terminal node, $KN_N$, connected to a decoding unit (DEC) of a second data transceiver which is adapted to decode the encrypted cipher data, $C_{data}$, received from the first data transceiver via a data transport link, DTL, using a relayed encryption key, $K_{enc}$, as a decoding key to retrieve the plain data, $P_{data}$; and at least one intermediate relay node adapted to perform a secure key relay of the encryption key, $K_{enc}$, used by the encoding unit from the initial node, $KN_0$, to the terminal node, $KN_N$, by performing a secure key relay method comprising the steps of:
sharing QKD-keys, K, between the nodes via secure quantum channels, QCH, of a quantum key distribution network, QKDN;
performing encryption of shared QKD-KEYS, K, at the initial node, $KN_0$, and at each intermediate relay node, $KN_1, KN_2 \ldots KN_{N-1}$, and blinding them with a blinding value, $S_i$, of the respective node to provide an encrypted cipher key, $CK_i$, by the initial node, $KN_0$, and by each intermediate relay node, $KN_1, KN_2 \ldots KN_{N-1}$;
transmitting the encrypted cipher keys, $CK_i$, of the initial node, $KN_0$, and of each of the intermediate relay nodes, $KN_1, KN_2 \ldots KN_{N-1}$, to the terminal node, $KN_N$; and
performing by the terminal node, $KN_N$, logic operations on blinding values, $S_i$, on the basis of the encrypted cipher keys, $CK_i$, received by the terminal node, $KN_N$, from the initial node, $KN_0$, and received from each of the intermediate relay nodes, $KN_1, KN_2 \ldots KN_{N-1}$, to provide the encryption key, $K_{enc}$, used by the decoding unit (DEC) of the second data transceiver as a decoding key to retrieve the plain data, $P_{data}$, wherein the blinding values, Si, of the initial node, $KN_0$, and of each of the intermediate relay nodes, $KN_1, KN_2 \ldots KN_{N-1}$, is reconstructed by the terminal node, $KN_N$, on the basis of the shares, p, received by the terminal node, $KN_N$.

14. The secure key relay system according to claim 13 wherein the initial node, $KN_0$, the terminal node, $KN_N$, and the at least one intermediate relay node comprise electrical or optical transceivers connected with each other by means of transport links used to transport the encrypted cipher keys, $CK_i$, and the shares, p, of the blinding values, $S_i$, between the transceivers.

15. The secure key relay system according to claim 13 wherein the initial node, $KN_0$, and the terminal node, $KN_N$, comprise trusted nodes of the secure key relay system.

16. The secure key relay system according to claim 13 wherein the initial node, the intermediate relay nodes and the terminal node are connected at least pairwise via secure quantum channels, QCH, of a quantum key distribution network, QKDN.

17. The secure key relay system according to claim 13 wherein the data transport link, DTL, used for transport of the encrypted cipher data between the first data transceiver and the second data transceiver comprises an optical data transport link, ODTL, or an electrical data transport link, EDTL.

* * * * *